United States Patent
Wang et al.

(10) Patent No.: US 10,644,611 B2
(45) Date of Patent: May 5, 2020

(54) VOLTAGE REFERENCE RECONFIGURATION FAULT-TOLERANT CONTROL METHOD FOR MULTI-LEVEL INVERTER

(71) Applicant: Shanghai Maritime University, Shanghai (CN)

(72) Inventors: Tianzhen Wang, Shanghai (CN); Zhuo Liu, Shanghai (CN); Chao Geng, Shanghai (CN); Jingang Han, Shanghai (CN)

(*) Notice: Subject to any disclaimer, the term of this patent is extended or adjusted under 35 U.S.C. 154(b) by 211 days.

(21) Appl. No.: 15/741,629

(22) PCT Filed: Oct. 28, 2016

(86) PCT No.: PCT/CN2016/103751
§ 371 (c)(1),
(2) Date: Jan. 3, 2018

(87) PCT Pub. No.: WO2017/190480
PCT Pub. Date: Nov. 9, 2017

(65) Prior Publication Data
US 2018/0217902 A1 Aug. 2, 2018

(30) Foreign Application Priority Data
May 6, 2016 (CN) .......................... 2016 1 0297592

(51) Int. Cl.
*H02M 7/49* (2007.01)
*H02M 1/32* (2007.01)

(52) U.S. Cl.
CPC ........ *H02M 7/49* (2013.01); *H02M 2001/325* (2013.01)

(58) Field of Classification Search
CPC . H02M 2001/0012; H02M 2001/0025; H02M 2001/325; H02M 2007/4835; H02M 1/32; H02M 7/483; H02M 7/49
See application file for complete search history.

(56) References Cited

U.S. PATENT DOCUMENTS

| | | | | |
|---|---|---|---|---|
| 5,986,909 A | * | 11/1999 | Hammond | H02M 7/49 363/37 |
| 8,018,331 B2 | * | 9/2011 | Jang | H02M 7/49 340/538.11 |

(Continued)

FOREIGN PATENT DOCUMENTS

| | | | | |
|---|---|---|---|---|
| CN | 102684467 B | * | 5/2016 | H02M 7/49 |
| EP | 2978092 A1 | * | 1/2016 | H02M 7/483 |
| EP | 3544169 A1 | * | 9/2019 | H02M 7/49 |

*Primary Examiner* — Fred E Finch, III
(74) *Attorney, Agent, or Firm* — Lei Jiang

(57) ABSTRACT

The present invention discloses a voltage reference reconfiguration fault-tolerant control method for a cascaded multi-level inverter. The fault-tolerant method for the inverter automatically reconfigures the three-phase voltage amplitudes and phases of the three-phase total voltage in accordance with the fault diagnosis, thus realizing three-phase voltage balance. On the basis of the reconfiguration of the total voltage signal, re-reconfiguration of reference voltage inputted into the various H-bridges is conducted in accordance with the fault signal vectors, thereby realizing removal of the fault bridges and fault-tolerance of the normal bridges, while guaranteeing the integral sinusoidal characteristics of the actual reference voltage. The inverter realized maximum three-phase balanced line voltage in a fault occurrence, has the advantages of requiring no redundant modules and algorithms and the advantages of ease of removing fault bridges, and is applicable for reduced load operable electrical equipment.

1 Claim, 4 Drawing Sheets

(56) References Cited

U.S. PATENT DOCUMENTS

| | | | |
|---|---|---|---|
| 9,929,642 B2* | 3/2018 | Pillonnet | H02M 1/32 |
| 9,929,676 B2* | 3/2018 | Lee | H02M 5/458 |
| 10,199,955 B2* | 2/2019 | Kalygin | H02M 5/4585 |
| 2007/0070667 A1* | 3/2007 | Stancu | H02M 1/32 |
| | | | 363/132 |
| 2008/0259661 A1* | 10/2008 | Hiller | H02M 7/49 |
| | | | 363/71 |
| 2011/0134666 A1* | 6/2011 | Hiller | H02M 7/49 |
| | | | 363/55 |
| 2012/0068555 A1* | 3/2012 | Aiello | H02M 7/483 |
| | | | 307/115 |
| 2013/0063995 A1* | 3/2013 | Norrga | H02M 1/32 |
| | | | 363/125 |
| 2014/0063870 A1* | 3/2014 | Bousfield, III | H02M 7/49 |
| | | | 363/37 |
| 2014/0078797 A1* | 3/2014 | Mihalache | H02M 7/49 |
| | | | 363/71 |
| 2017/0164495 A1* | 6/2017 | Aarskog | E21B 33/0385 |
| 2018/0091058 A1* | 3/2018 | Cheng | H02M 1/12 |
| 2018/0159328 A1* | 6/2018 | Chung | H02J 3/1857 |
| 2018/0226900 A1* | 8/2018 | Xie | H02M 1/32 |

\* cited by examiner

US 10,644,611 B2

VOLTAGE REFERENCE RECONFIGURATION FAULT-TOLERANT CONTROL METHOD FOR MULTI-LEVEL INVERTER

FIELD OF INVENTION

The present invention relates to fault-tolerant control for a multi-level inverter in power electronics, and relates in particular to a voltage reference reconfiguration fault-tolerant control method for a multi-level inverter.

BACKGROUND ART

Recent years have seen rapid promotion and application of high-voltage high-power converters in industrial manufacturing and transportation, thanks to their excellent properties and energy saving effectiveness. On the other hand, voltage withstand capacity of switching devices has severely constrained development of high voltage frequency conversion techniques. To obtain higher output voltage on the basis of current level of switching devices, multi-level inverters find wide applications in industrial manufacturing, transportation, and aerospace, owing to their high quality of output power, low voltage stress, and low switching loss. Topologies of a multi-level inverter mainly include diode-clamped, flying capacitor, or cascaded multi-level inverters. Among them, a bridge multi-level inverter finds wide application in industry as it can do without a large number of clamped diodes and capacitors, has no need for balanced capacitance and voltage, and has an easily modularized and expandable structure with good power quality.

However, an H-bridge multi-level inverter employed in actual industrial process contains a large number of H-bridges in each phase, which greatly increases the occurrence of open or short circuits for the switching devices. Further, with the increase of voltage, fault occurrence probability increases. An H-bridge multi-level inverter indeed provides convenience for applying electrical and electronic techniques in high voltage and large power applications, but once a fault takes place, a small one might cause factory shut down, while a severe one might result in catastrophic incidents and huge societal loss. Research indicates that switching device faults account for 82.5% of faults of the whole drive system in an inverter-powered variable frequency speed regulation system, and thus a switching device is the most vulnerable sector in the drive system.

Currently, there are two fault-tolerant strategies for countering inverter open circuit IGBT faults. One of the strategies is the hardware redundant method of adding redundant bridges or redundant modules. Such a method may operate with full load, but is at the cost of increase of cost, inverter weight, and complexity. In situations where volume and weight are strictly restricted, such a method is not adoptable. The other strategy taking reduction of manufacturing cost into account is to make use of the available switching devices and to operate under reduced load, wherein fault-tolerant objective is achieved by means of altering the control algorithm. Traditional multi-level inverter PWM waveform modulation algorithm is unable to adapt to inverter control subsequent to removal of fault modules, requiring a substitute thereof for fault controlling. The higher level of the inverter, the more pieces of redundant algorithm are required to be added in. Moreover, algorithm switching requires fault diagnosis and algorithm selection. In a high level multi-level inverter, fault types are numerous, time for overall algorithm selection is long, and thus system response time is extended.

SUMMARY OF THE INVENTION

The present invention is the first in incorporating fault signals in multi-level inverter PWM waveform configuration under fault condition, wherein fault bridges are removed and normal bridges are fault-controlled by means of reconfiguration of total reference voltage amplitude, phase, and reconfiguration of reference voltage of the various H-bridges.

The object of the present invention is to provide a reference voltage reconfiguration fault-tolerant control method for fault control of a multi-level inverter, with the technical solution as follows:

A voltage reference reconfiguration fault-tolerant control method for a multi-level inverter is disclosed, wherein the inverter comprises a plurality of DC power sources, an H-bridge circuit, a fault diagnosis module, a PWM waveform generating module, and a resistor. The PWM waveform generating module generates a switching signal for driving the H-bridge circuit in converting DC from the DC power source into AC. Voltage of the AC is measured for a fault diagnosis, with an outcome of the fault diagnosis being employed for reconfiguring a PWM waveform in fault-controlling the inverter. The fault diagnosis is driven, wherein three-phase voltage signals corresponding to each type of fault under normal and fault conditions respectively are sampled for signal preprocessing with fast Fourier transform (FFT), principal component extraction by principal component analysis (PCA), and back propagation (BP) neural network training to obtain a BP neural network weight matrix, called pre-set weight matrix. The fault features of many signals are not obvious in the time domain, but they are obvious in the frequency domain. Therefore, the signals in the time domain are often converted to the frequency domain by Fourier transform to achieve the purpose of fault feature extraction. PCA algorithm is adopted for dimensionality reduction processing of data to speed up the training of neural networks. In a real-time system, three-phase voltage signals are sampled for FFT, PCA principal component extraction, and are combined with the pre-set weight matrix for fault diagnosis.

Each phase of a main circuit of the cascaded multi-level inverter is comprised of n H-bridges. Each H-bridge comprises a plurality of IGBTs, wherein n is an integer greater than or equal to two. A triac as an isolation switch is installed between a left arm and a right arm of each H-bridge for isolation of a faulty H-bridge in case of occurrence of a fault in the faulty H-bridge. The carrier disposition SPWM modulation algorithm is selected as the principle PWM waveform modulation algorithm.

For the H-bridge circuit, all the IGBTs open circuit faults are categorized as one type. That is, no matter how many faults occur for the fault IGBT bridges, they are regarded as an H-bridge fault. The present invention is thus more suited for fault-tolerant control of the H-bridges.

Real-time detection and fault diagnosis of the output voltage of the inverter is carried out via the fault diagnosis module. Amplitude and phase of the three-phase total reference voltage are then configured according to the outcome of the diagnosis, with a fault signal vector being set up for reconfiguration of the reference voltage signal of each H-bridge and fault-tolerant control being conducted for the H-bridge multi-level inverter utilizing the reconfigured PWM waveform.

is as follows:

Step 1, pre-setting a three-phase fault signal vector:

letting $\lambda_{Ai}$ i=1, 2, 3, ... n, be a fault signal for an ith H-bridge in an A-phase, with $\lambda_{Ai}$=0 representing occurrence of no fault in the ith H-bridge, $\lambda_{Ai}$=1 representing occurrence of the fault in the ith H-bridge, $u_{Aref+}(t)$ standing for a reference voltage of a PWM waveform generated in comparison with a triangular waveform of a left arm in the ith H-bridge in the A-phase, and $u_{Aref-}(t)$ standing for a reference voltage of a PWM waveform generated in comparison with a triangular waveform of a right arm in the ith H-bridge in the A-phase and $u_{Aref}(t)$ standing for a reference voltage of a PWM waveform generated in comparison with a triangular waveform in the ith H-bridge in the A-phase; letting $\lambda_{Bi}$ i=1, 2, 3, ... n, be a fault signal for an ith H-bridge in a B phase, $\lambda_{Bi}$=0 representing occurrence of no fault in the ith H-bridge, $\lambda_{Bi}$=1 representing occurrence of a fault in the ith H-bridge; $u_{Bref+}(t)$ standing for a reference voltage of a PWM waveform generated in comparison with a triangular waveform of a left arm in the ith H-bridge in the B-phase, and $u_{Bref-}(t)$ standing for a reference voltage of a PWM waveform generated in comparison with a triangular waveform of a right arm in the ith H-bridge in the B-phase and $u_{Bref}(t)$ standing for a reference voltage of a PWM waveform generated in comparison with a triangular waveform in the ith H-bridge in the B-phase; letting $\lambda_{Ci}$ i=1, 2, 3, ... n, be a fault signal for an ith H-bridge in a C phase, with $\lambda_{Ci}$=0 representing occurrence of no fault in the ith H-bridge, $\lambda_{Ci}$=1 representing occurrence of a fault in the ith H-bridge; $u_{Cref+}(t)$ standing for a reference voltage of a PWM waveform generated in comparison with a triangular waveform of a left arm in the ith H-bridge in the C-phase, and $u_{Cref-}(t)$ standing for a reference voltage of a PWM waveform generated in comparison with a triangular waveform of a right arm in the ith H-bridge in the C-phase and $u_{Cref}(t)$ standing for a reference voltage of a PWM waveform generated in comparison with a triangular waveform in the ith H-bridge in the C-phase;

For a three-phase voltage under normal operation, fault signal for each H-bridge is 0, and thus reference voltages are as follows:

$$\begin{cases} u_{Aref}(t) = u_{Aref+}(t) = u_{Aref-}(t) = n\sin(100\pi t) \\ u_{Bref}(t) = u_{Bref+}(t) = u_{Bref-}(t) = n\sin\left(100\pi t + \frac{2\pi}{3}\right) \\ u_{Cref}(t) = u_{Cref+}(t) = u_{Cref-}(t) = n\sin\left(100\pi t - \frac{2\pi}{3}\right) \end{cases}$$

Setting the three-phase fault signal vector as:

$$A = \begin{bmatrix} \lambda_{A1} + \lambda_{A2} + \cdots + \lambda_{An-1} - n\lambda_{An} \\ \vdots \\ \lambda_{A1} + \lambda_{A2} + \cdots + \lambda_{Ai-1} - n\lambda_{Ai} \\ \vdots \\ \lambda_{A1} - n\lambda_{A2} \\ -n\lambda_{A1} \end{bmatrix},$$

$$B = \begin{bmatrix} \lambda_{B1} + \lambda_{B2} + \cdots + \lambda_{Bn-1} - n\lambda_{Bn} \\ \vdots \\ \lambda_{B1} + \lambda_{B2} + \cdots + \lambda_{Bi-1} - n\lambda_{Bi} \\ \vdots \\ \lambda_{B1} - n\lambda_{B2} \\ -n\lambda_{B1} \end{bmatrix},$$

$$C = \begin{bmatrix} \lambda_{C1} + \lambda_{C2} + \cdots + \lambda_{Cn-1} - n\lambda_{Cn} \\ \vdots \\ \lambda_{C1} + \lambda_{C2} + \cdots + \lambda_{Ci-1} - n\lambda_{Ci} \\ \vdots \\ \lambda_{C1} - n\lambda_{C2} \\ -n\lambda_{C1} \end{bmatrix},$$

Step 2, pre-setting three-phase reference voltage amplitude coefficients

Let p, q, r be a number of healthy bridges respectively in phases A, B, and C. Reconfiguration of reference voltage amplitude coefficients:

When p=q=r, let p*=q*=r*=p=q=r, $$\theta_{AB} = \theta_{BC} = \theta_{AC} = \frac{2\pi}{3},$$

wherein, $\theta_{AB}$, $\theta_{BC}$, $\theta_{AC}$ are respectively the phase differences between phases A and B, between B and C, and between A and C, and p*, q*, r* are respectively the reference voltage amplitude coefficients for phases A, B, and C.

Step 3, removing each faulty H-bridge by means of the respective isolation switch:

Obtaining fault locations and numbers thereof for all the IGBTs, and closing the isolation of each respective H-bridge where a faulty IGBT is located, thereby removing the fault H-bridge from the inverter.

Step 4, reconfiguring total phase voltages for the three phases:

When A-phase has the most numerous normal bridges, and for p<q+r, then $\theta_{AB}$, $\theta_{BC}$, $\theta_{AC}$, p*, q*, and r* are configuring in accordance with expression (1):

$$\begin{cases} p^2 + q^2 - 2pq\cos(\theta_{AB}) = p^2 + r^2 - 2pr\cos(\theta_{AC}) \\ \quad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (1)$$

for p≥q+r, then $\theta_{AB}$, $\theta_{BC}$, $\theta_{AC}$, p*, q*, and r* are configuring in accordance with expression (2):

$$\begin{cases} p^* = \sqrt{q^2 + qr + r^2}, q^* = q, r^* = r \\ \theta_{AB} = \cos^{-1}\left(\frac{q-r}{2p^*}\right) \\ \theta_{AB} + \theta_{AC} + \theta_{BC} = 360°, \theta_{BC} = 180° \end{cases} \quad (2)$$

When B-phase has the most numerous normal bridges, for q<p+r, then $\theta_{AB}$, $\theta_{BC}$, $\theta_{AC}$, p*, q*, and r* are configuring in accordance with expression (3):

$$\begin{cases} p^2 + q^2 - 2pq\cos(\theta_{AB}) = p^2 + r^2 - 2pr\cos(\theta_{AC}) \\ \quad\quad\quad\quad\quad\quad\quad\quad\quad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (3)$$

for q≥p+r, then $\theta_{AB}$, $\theta_{BC}$, $\theta_{AC}$, p*, q*, and r* are configuring in accordance with expression (4):

$$\begin{cases} q^* = \sqrt{p^2 + pr + r^2}, p^* = p, r^* = r \\ \theta_{BC} = \cos^{-1}\left(\dfrac{r-p}{2q}\right) \\ \theta_{AB} + \theta_{AC} + \theta_{BC} = 360°, \theta_{AC} = 180° \end{cases} \quad (4)$$

When C-phase has the most numerous normal bridges, for r<p+q, then $\theta_{AB}$, $\theta_{BC}$, $\theta_{AC}$, p*, q*, and r* are configuring in accordance with expression (5):

$$\begin{cases} p^2 + q^2 - 2pq\cos(\theta_{AB}) = p^2 + r^2 - 2pr\cos(\theta_{AC}) \\ \quad\quad\quad\quad\quad\quad\quad\quad\quad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (5)$$

for r≥p+q, then $\theta_{AB}$, $\theta_{BC}$, $\theta_{AC}$, p*, q*, and r* are reconfigured in accordance with expression (6):

$$\begin{cases} q^* = \sqrt{p^2 + pr + r^2}, p^* = p, r^* = r \\ \theta_{AC} = \cos^{-1}\left(\dfrac{p-q}{2r^*}\right) \\ \theta_{AB} + \theta_{AC} + \theta_{BC} = 360°, \theta_{AB} = 180° \end{cases} \quad (6)$$

Thus the reference voltage amplitude coefficients and the phase differences of the three phases under various conditions are obtained via the above calculations.

Conducting fault bridge removal and reference voltage reconfiguration for the healthy bridges as follows:

Update the fault signal vectors A, B, and C according to the fault locations and the numbers thereof for all the IGBTs. Calculate remaining normal bridges for each said phase according to expression (7).

$$\begin{cases} p = n - \sum_{i=1}^{n} \lambda_{Ai} \\ q = n - \sum_{i=1}^{n} \lambda_{Bi} \\ r = n - \sum_{i=1}^{n} \lambda_{Ci} \end{cases} \quad (7)$$

Reconfigure the total phase voltages for the three phases by means of selecting the corresponding reference voltage amplitude coefficients and reconfigured phase values calculated in accordance with the p, q, and r values:

$$\begin{cases} u_{Aref}(t) = p^*\sin(100\pi t) \\ u_{Bref}(t) = q^*\sin(100\pi t + \theta_{AB}) \\ u_{Cref}(t) = r^*\sin(100\pi t - \theta_{AC}) \end{cases} \quad (8)$$

Step 5 reconfiguring the remaining normal bridges

Reconfiguring the reference voltage signal for the fault bridge in combination with the expression (9), $$\begin{cases} u_{Arefi+}(t) = p^*\sin(100\pi t) + A(i) \\ u_{Arefi-}(t) = p^*\sin(100\pi t) - A(i) \\ u_{Brefi+}(t) = q^*\sin(100\pi t + \theta_{AB}) + B(i) \\ u_{Brefi-}(t) = q^*\sin(100\pi t + \theta_{AB}) - B(i) \\ u_{Crefi+}(t) = r^*\sin(100\pi t - \theta_{AC}) + C(i) \\ u_{Crefi-}(t) = r^*\sin(100\pi t - \theta_{AC}) - C(i) \end{cases} \quad (9)$$

By means of the afore-mentioned re-reconfiguration of the on-line reference voltage signal, removal of the fault bridges for the cascaded H-bridge multi-level inverter under non-redundant algorithm is realized, enabling the cascaded H-bridge multi-level inverter to operate under reduced voltage level and balanced three phase voltages.

The present invention is advantageous in that:

1. The present invention reconfigures the three-phase voltage amplitudes and phases in accordance with the fault diagnosis, thus realizing three-phase voltage balance.

2. The present invention re-reconfigures the reference voltage signal for the fault bridges to realize zero voltage on both ends of the bypass circuit breaker, thereby eliminating possible security hazards.

3. The present invention re-reconfigures the reference voltage signals for the normal bridges to realize voltage transmission among bridges, thus achieving fault-tolerant objective.

4. The present invention adopts the same PWM waveform modulation method for the inverter both under normal and fault conditions, and thereby has no algorithm redundancy or increased complexity for the control program, thus reducing controller fault likelihood.

The present invention will be expounded in more details with the figures and an embodiment hereunder provided.

EMBODIMENTS

Figure 1:
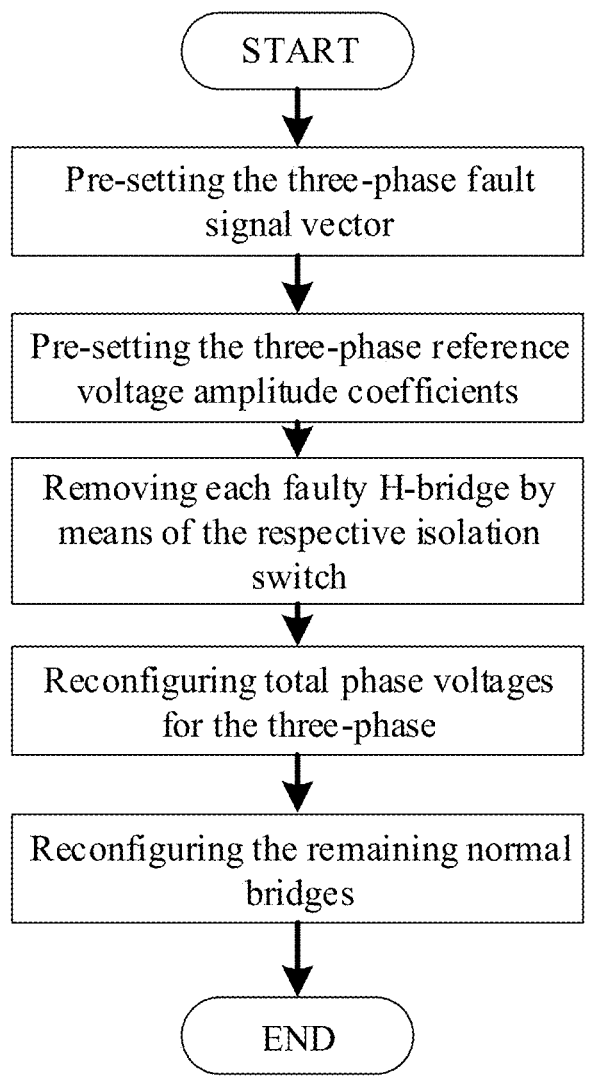
FIG. 1 is a flow chat of a voltage reference reconfiguration fault-tolerant control method for an H-bridge multi-level inverter of the present invention.

As is shown in FIG. 1, voltage reference reconfiguration fault-tolerant control method for an H-bridge multi-level inverter of the present invention is shown. The method comprises the steps of: setting a three-phase fault signal vector, pre-setting three-phase reference voltage amplitude coefficients, removing each faulty H-bridge by means of the respective isolation switch, reconfiguring total phase voltages for the three phases and reconfiguring the remaining normal bridges.

Figure 2:
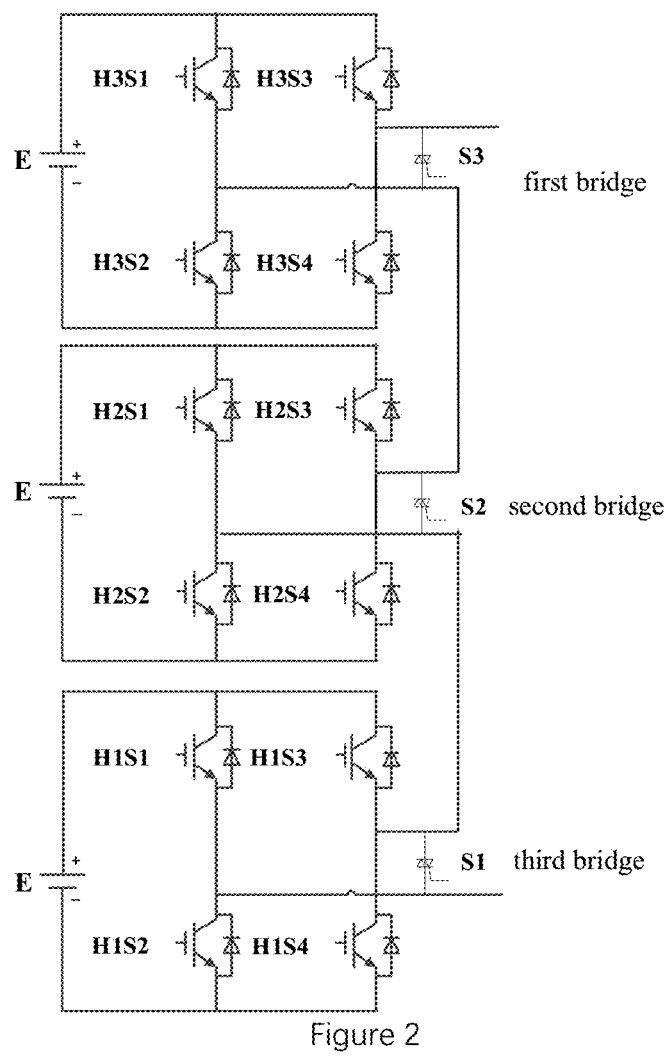
FIG. 2 is a topological diagram depicting single phase main circuit tolerance for a seven-level cascaded H-bridge inverter of the present invention.

The H-bridge seven-level inverter consists of three single-phase H-bridge structures as are shown in FIG. 2. Each phase consists of three cascaded H-bridges. They are respectively the first H-bridge, the second H-bridge, and the third H-bridge. The four triacs of the first H-bridge are respectively denoted as H1S1, H1S2, H1S3, and H1S4, those of the second H-bridge are respectively denoted as H2S1, H2S2, H2S3, and H2S4, while those of the third H-bridge are respectively denoted as H3S1, H3S2, H3S3, and H3S4, with each triac being an IGBT. Vo1, Vo2, and Vo3 respectively denote the output voltage of the first, second, and third H-bridge, Vo denotes the total output voltage of the inverter, output ends of the three H-bridges being cascaded such that Vo=Vo1+Vo2+Vo3. Since the voltage of each of the three DC power sources is 24V, there exist three output states, 0V, ±24V, for each of Vo1, Vo2, and Vo3. Thus, at any given moment, Vo equals one of ±72V, ±48V, ±24V, or 0V, with each phase of the inverter outputting seven different voltage levels. On both ends of each H-bridge, there is parallel connected a fault isolating switch for realization of removal of fault bridges in case of occurrence of a fault.

The fault diagnosis module of the inverter adopts a fault diagnosis method based on data driving. Three-phase voltage samples are first collected respectively for normal and fault situations in accordance with the types of the faults. FFT, PCA principal component extraction, and BP neural network data pre-processing are then conducted for the samples to obtain a BP neural network weight matrix. And finally in the real-time system, FFT, PCA principal component extraction are conducted for the three-phase voltage samples in combination with the pre-set weight matrix for conducting fault diagnosis.

The specific fault-tolerant method is as follows:

Step 1, pre-setting a three-phase fault signal vectors: In a seven-level inverter, let the fault signal vectors of the phases A, B, and C respectively be A, B, and C, wherein $\lambda_{A1}$, $\lambda_{A2}$, and $\lambda_{A3}$ are respectively the fault signals of the first, second, and third bridges of phase A. Alternatively, $\lambda_{B1}$, $\lambda_{B2}$, $\lambda_{B3}$, $\lambda_{C1}$, $\lambda_{C2}$, $\lambda_{C3}$ are respectively the fault signals of the first, second, and third bridges of phases B and C. The fault signal vectors may then be set up as:

$$A = \begin{bmatrix} \lambda_{A1} + \lambda_{A2} - 3\lambda_{A3} \\ \lambda_{A1} - 3\lambda_{A2} \\ -3\lambda_{A1} \end{bmatrix},$$

$$B = \begin{bmatrix} \lambda_{B1} + \lambda_{B2} - 3\lambda_{B3} \\ \lambda_{B1} - 3\lambda_{B2} \\ -3\lambda_{B1} \end{bmatrix},$$

$$C = \begin{bmatrix} \lambda_{C1} + \lambda_{C2} - 3\lambda_{C3} \\ \lambda_{C1} - 3\lambda_{C2} \\ -3\lambda_{C1} \end{bmatrix}$$

Step 2, pre-setting three-phase reference voltage amplitude coefficients and phase reconfiguration: Let p, q, r be a number of healthy bridges respectively in phases A, B, and C. Reconfiguration of reference voltage amplitude coefficients and phase differences of the three phases in accordance with fault conditions is conducted as follows:

When p=q=r, let p*=q*=r*=q=r, $$\theta_{AB} = \theta_{BC} = \theta_{AC} = \frac{2\pi}{3},$$

wherein $\theta_{AB}$, $\theta_{BC}$, $\theta_{AC}$ are respectively the phase differences between phases A and B, between B and C, and between A and C, and p*, q*, r* are respectively the reference voltage amplitude coefficients for phases A, B, and C.

Step 3, removing each faulty H-bridge by means of the respective isolation switch:
Obtaining fault locations and numbers thereof for all the IGBTs, and closing the isolation switch of each respective H-bridge where a faulty IGBT is located, thereby removing the fault H-bridge from the inverter.

Step 4, reconfiguring total phase voltages for the three phases:
When A-phase has the most numerous normal bridges, and for p<q+r, then $\theta_{AB}$, $\theta_{BC}$, $\theta_{AC}$, p*, q*, and r* are configuring in accordance with expression (1):

$$\begin{cases} p^2 + q^2 - 2pq\cos(\theta_{AB}) = p^2 + r^2 - 2pr\cos(\theta_{AC}) \\ \quad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (1)$$

for p≥q+r, then $\theta_{AB}$, $\theta_{BC}$, $\theta_{AC}$, p*, q*, and r* are configuring in accordance with expression (2):

$$\begin{cases} p^* = \sqrt{q^2 + qr + r^2}, q^* = q, r^* = r \\ \theta_{AC} = \cos^{-1}\left(\frac{q-r}{2p^*}\right) \\ \theta_{AB} + \theta_{AC} + \theta_{BC} = 360°, \theta_{AB} = 180° \end{cases} \quad (2)$$

When B-phase has the most numerous normal bridges,
for q<p+r then $\theta_{AB}$, $\theta_{BC}$, $\theta_{AC}$, p*, q*, and r* are configuring in accordance with expression (3):

$$\begin{cases} p^2 + q^2 - 2pq\cos(\theta_{AB}) = p^2 + r^2 - 2pr\cos(\theta_{AC}) \\ \quad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (3)$$

for q≥p+r, then $\theta_{AB}$, $\theta_{BC}$, $\theta_{AC}$, p*, q*, and r* are configuring in accordance with expression (4):

$$\begin{cases} q^* = \sqrt{p^2 + pr + r^2}, p^* = p, r^* = r \\ \theta_{BC} = \cos^{-1}\left(\frac{r-p}{2q^*}\right) \\ \theta_{AB} + \theta_{AC} + \theta_{BC} = 360°, \theta_{AC} = 180° \end{cases} \quad (4)$$

When C-phase has the most numerous normal bridges, for r<p+q, then $\theta_{AB}$, $\theta_{BC}$, $\theta_{AC}$, p*, q*, and r* are configuring in accordance with expression (5):

$$\begin{cases} p^2 + q^2 - 2pq\cos(\theta_{AB}) = p^2 + r^2 - 2pr\cos(\theta_{AC}) \\ \qquad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (5)$$

for r≥p+q, then $\theta_{AB}$, $\theta_{BC}$, $\theta_{AC}$, p*, and r* are configuring in accordance with expression (6):

$$\begin{cases} q^* = \sqrt{p^2 + pr + r^2}, \ p^* = p, \ r^* = r \\ \theta_{AC} = \cos^{-1}\left(\dfrac{p-q}{2r^*}\right) \\ \theta_{AB} + \theta_{AC} + \theta_{BC} = 360°, \theta_{AB} = 180° \end{cases} \quad (6)$$

Figure 3:
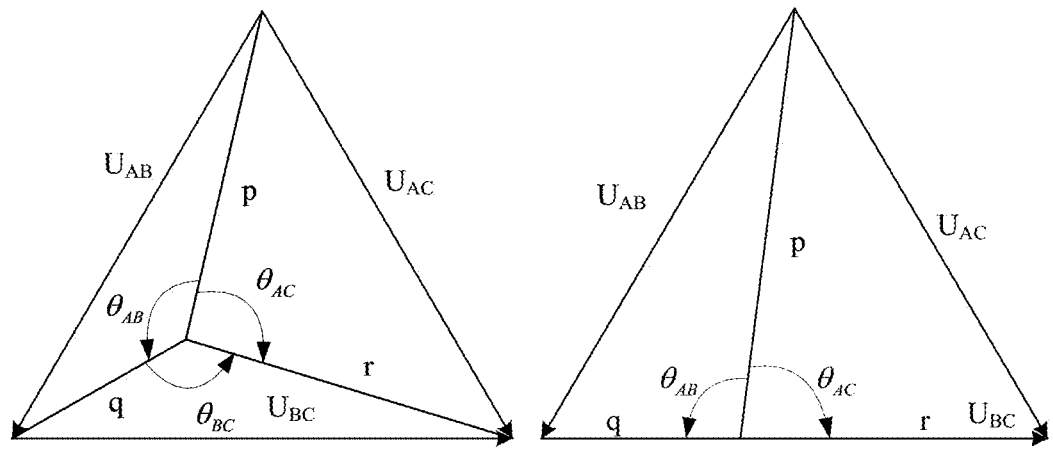
FIG. 3 is a vector diagram depicting three-phase voltage amplitude coefficients and phase differences of the present invention.

According to the afore-mentioned expressions (1)-(6), reconfigured values of the three-phase reference phase voltage amplitude coefficients and phase differences may be calculated in accordance with their corresponding fault types of the cascaded H-bridge inverter. FIG. 3 shows a vector diagram depicting the three-phase voltage amplitude coefficients and phase differences. As may be seen therefrom, the reconfigured three-phase line voltage amplitudes are identical under different fault conditions with the same phase difference of 120°. Take the case of p≥q ≥r as an example, wherein the calculated three-phase reference phase voltage difference amplitude coefficients and the phase difference reconfigured values are listed in Table 1, with $v_H$ representing the reconfigured three-phase line voltage per-unit value.

TABLE 1 three-phase reference phase voltage difference amplitude coefficients and the phase difference reconfigured values

| A | B | C | $\theta_{AB}$ | $\theta_{AC}$ | p* | q* | r* | $v_{ll}$ (pu) |
|---|---|---|------|------|------|------|------|------|
| 3 | 3 | 2 | 99° | 130° | 3 | 3 | 2 | 4.56 |
| 3 | 3 | 1 | 79° | 140° | 3 | 3 | 1 | 3.82 |
| 3 | 2 | 2 | 101° | 101° | 3 | 2 | 2 | 3.92 |
| 3 | 2 | 1 | 79.1° | 100.9° | 2.65 | 2 | 1 | 3 |
| 3 | 1 | 1 | 90° | 90° | 1.73 | 1 | 1 | 2 |
| 2 | 2 | 2 | 120° | 120° | 2 | 2 | 2 | 3.46 |
| 2 | 2 | 1 | 89° | 135° | 2 | 2 | 1 | 2.8 |
| 2 | 1 | 1 | 90° | 90° | 1.73 | 1 | 1 | 2 |
| 1 | 1 | 1 | 120° | 120° | 1 | 1 | 1 | 1.73 |

Conducting fault bridge removal and reference voltage reconfiguration for the healthy bridges as follows:
update the fault signal vectors A, B, and C according to the fault locations and the numbers thereof for all the IGBTs. Calculate the remaining normal bridges for each said phase according to expression (7).

$$\begin{cases} p = n - \sum_{i=1}^{n}\lambda_{Ai} \\ q = n - \sum_{i=1}^{n}\lambda_{Bi} \\ r = n - \sum_{i=1}^{n}\lambda_{Ci} \end{cases} \quad (7)$$

Reconfigure the total phase voltages for the three phases by means of selecting the corresponding reference voltage amplitude coefficients and reconfigured phase values calculated in off-line setting in accordance with the p, q, and r values calculated in on-line setting:

$$\begin{cases} u_{Aref}(t) = p^*\sin(100\pi t) \\ u_{Bref}(t) = q^*\sin(100\pi t + \theta_{AB}) \\ u_{Cref}(t) = r^*\sin(100\pi t - \theta_{AC}) \end{cases} \quad (8)$$

Step 5 reconfiguring the remaining normal bridges:
reconfigure the reference voltage signal for the fault bridge in combination with the expression (9).

$$\begin{cases} u_{Arefi+}(t) = p^*\sin(100\pi t) + A(i) \\ u_{Arefi-}(t) = p^*\sin(100\pi t) - A(i) \\ u_{Brefi+}(t) = q^*\sin(100\pi t + \theta_{AB}) + B(i) \\ u_{Brefi-}(t) = q^*\sin(100\pi t + \theta_{AB}) - B(i) \\ u_{Crefi+}(t) = r^*\sin(100\pi t - \theta_{AC}) + C(i) \\ u_{Crefi-}(t) = r^*\sin(100\pi t - \theta_{AC}) - C(i) \end{cases} \quad (9)$$

Figure 4:
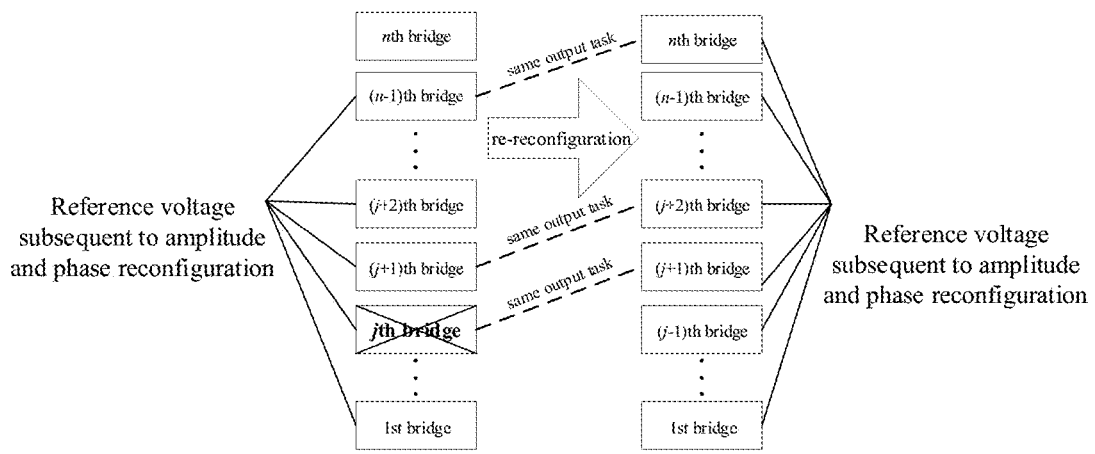
FIG. 4 is a schematic diagram depicting relay of tasks for voltage output from bridge to bridge under A-phase single fault of the present invention.

The reconfiguration method of the present invent is mainly based on task relay in-between the bridges, wherein a voltage output task for a fault bridge is relayed to a normal H-bridge in a layer there-above, while a voltage output task for a normal bridge is relayed to another normal H-bridge in a layer further above, and so on, such that total voltage output is realized subsequent to total voltage amplitude reconfiguration; as is shown in FIG. 4, depicting relay of tasks for voltage output from bridge to bridge under A-phase single fault.

Via the afore-mentioned steps, fault-tolerant control of single and multiple faults of the seven-level inverter is realized, while keeping the three-phase line voltage in balance at the mean time. After the faults are removed, by just setting all the fault signals to 0, the inverter will resume normal operation.

Figure 5:
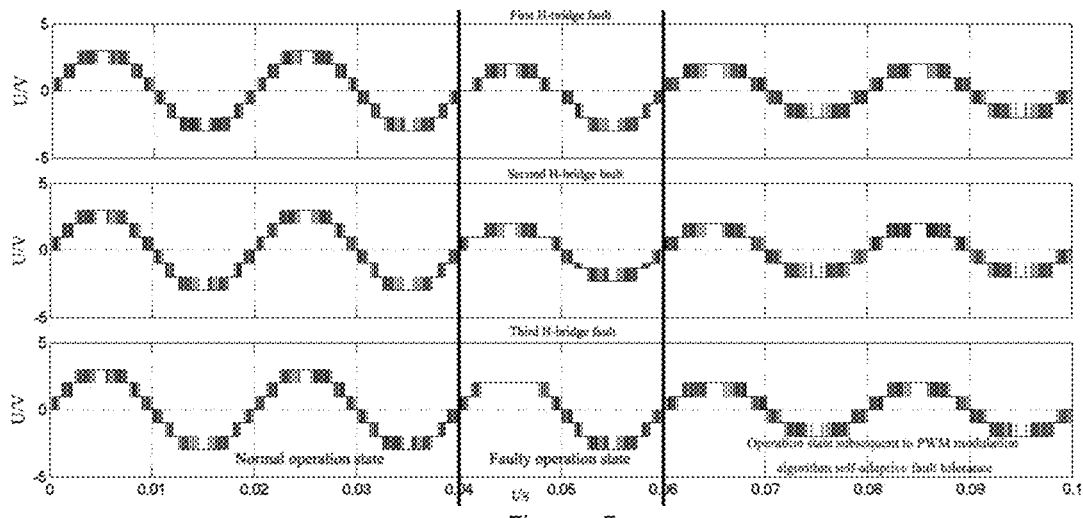
FIG. 5 is a fault-tolerant waveform of the A phase voltage of the H-bridge seven-level inverter of the present invention.
Figure 6:
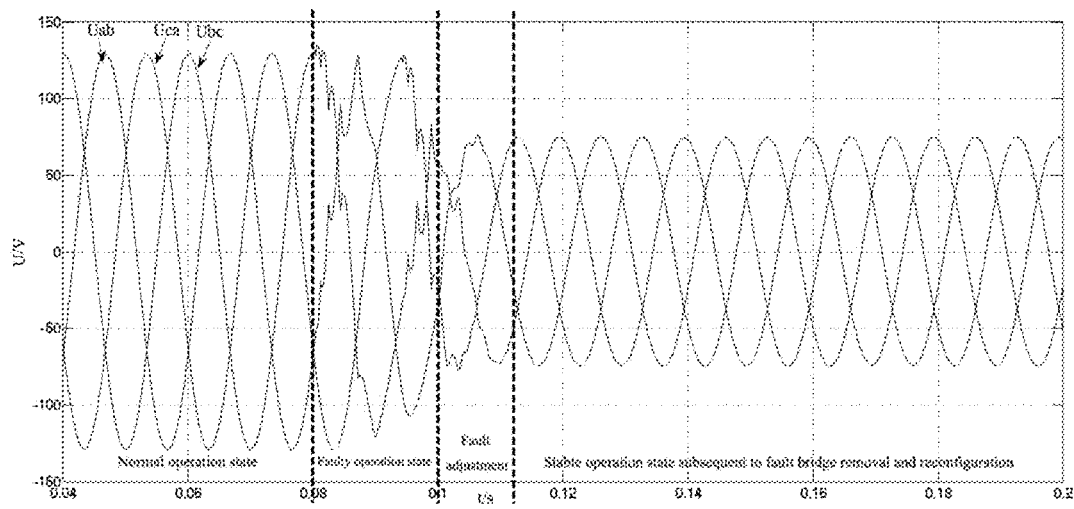
FIG. 6 is a schematic waveform diagram of the three-phase line voltage of the H-bridge seven-level inverter prior to and subsequent to fault tolerance respectively under close-loop of the present invention.

FIG. 5 shows total output voltage waveform of the A-phase voltage for the various H-bridges of the seven-level inverter under open loop prior and subsequent to fault tolerance in the case of a fault occurrence. As may be seen therefrom, the method of the present invention realizes safe and stable fault-tolerant control under non-redundancy and reduced voltage level, wherein a fault diagnosis time slice of 0.02 s is taken into account. FIG. 6 is a schematic waveform diagram of the three-phase line voltage of the cascaded seven-level inverter prior to and subsequent to fault occurrence respectively under close-loop, wherein the three-phase line voltage undergoes significant distortion under fault occurrence, but tends to be stable and balance subsequent to application of the fault-tolerant control method of the present invention, indicating efficacy of the fault-tolerant control method of the present invention for fault-tolerant control of a cascaded seven-level inverter.

The basic principles and chief characteristics, as well as the advantages of the present invention have thus been described. A person of the art shall understand that the present invention is not limited to the afore-described embodiment, that the embodiment and the accompanying description only serve to delineate the principles of the present invention, and that various modifications and improvements without departure from the spirit and scope of the present invention shall fall within the scope of protection of the present invention. The scope of protection as requested by the present invention is defined by the accompanying Claims and the equivalents thereof.

The invention claimed is:

1. A voltage reference reconfiguration fault-tolerant control method for a multi-level inverter, with each phase of a main circuit of the multi-level inverter being comprised of n H-bridges, each H-bridge comprising a plurality of IGBTs, wherein n is an integer greater than or equal to two;

a triac as an isolation switch is installed between a left arm and a right arm of each H-bridge for isolation of a faulty H-bridge in case of occurrence of a fault in the faulty H-bridge;

wherein the voltage reference reconfiguration fault-tolerant control method comprises the following steps:

Step 1, pre-setting the three-phase fault signal vector:

letting $\lambda_{Ai}$ i=1, 2, 3, . . . n, be a fault signal for an ith H-bridge in an A-phase, with $\lambda_{Ai}=0$ representing occurrence of no fault in the ith H-bridge, $\lambda_{Ai}=1$ representing occurrence of the fault in the ith H-bridge, $u_{Aref+}(t)$ standing for a reference voltage of a PWM waveform generated in comparison with a triangular waveform of a left arm in the ith H-bridge in the A-phase, and $u_{Aref-}(t)$ standing for a reference voltage of a PWM waveform generated in comparison with a triangular waveform of a right arm in the ith H-bridge in the A-phase and $u_{Aref}(t)$ standing for a reference voltage of a PWM waveform generated in comparison with a triangular waveform in the ith H-bridge in the A-phase; letting $\lambda_{Bi}$ i=1, 2, 3, . . . n, be a fault signal for an ith H-bridge in a B phase, with $\lambda_{Bi}=0$ representing occurrence of no fault in the ith H-bridge, $\lambda_{Bi}=1$ representing occurrence of a fault in the ith H-bridge; $u_{Bref+}(t)$ standing for a reference voltage of a PWM waveform generated in comparison with a triangular waveform of a left arm in the ith H-bridge in the B-phase, and $u_{Bref-}(t)$ standing for a reference voltage of a PWM waveform generated in comparison with a triangular waveform of a right arm in the ith H-bridge in the B-phase and $u_{Bref}(t)$ standing for a reference voltage of a PWM waveform generated in comparison with a triangular waveform in the ith H-bridge in the B-phase; letting $\lambda_{Ci}$ i=1, 2, 3, . . . n, be a fault signal for an ith H-bridge in a C phase, with $\lambda_{Ci}=0$ representing occurrence of no fault in the ith H-bridge, $\lambda_{Ci}=1$ representing occurrence of a fault in the ith H-bridge; $u_{Cref+}(t)$ standing for a reference voltage of a PWM waveform generated in comparison with a triangular waveform of a left arm in the ith H-bridge in the C-phase, and $u_{Cref-}(t)$ standing for a reference voltage of a PWM waveform generated in comparison with a triangular waveform of a right arm in the ith H-bridge in the C-phase and $u_{Cref}(t)$ standing for a reference voltage of a PWM waveform generated in comparison with a triangular waveform in the ith H-bridge in the C-phase;

for a three-phase voltage under normal operation, the fault signal for each H-bridge being 0, and thus the reference voltages being as follows:

$$\begin{cases} u_{Aref}(t) = u_{Aref+}(t) = u_{Aref-}(t) = n\sin(100\pi t) \\ u_{Bref}(t) = u_{Bref+}(t) = u_{Bref-}(t) = n\sin\left(100\pi t + \frac{2\pi}{3}\right) \\ u_{Cref}(t) = u_{Cref+}(t) = u_{Cref-}(t) = n\sin\left(100\pi t - \frac{2\pi}{3}\right) \end{cases}$$

Setting the three-phase fault signal vector as:

$$A = \begin{bmatrix} \lambda_{A1} + \lambda_{A2} + \ldots + \lambda_{An-1} - n\lambda_{An} \\ \vdots \\ \lambda_{A1} + \lambda_{A2} + \ldots + \lambda_{Ai-1} - n\lambda_{Ai} \\ \vdots \\ \lambda_{A1} - n\lambda_{A2} \\ -n\lambda_{A1} \end{bmatrix},$$

$$B = \begin{bmatrix} \lambda_{B1} + \lambda_{B2} + \ldots + \lambda_{Bn-1} - n\lambda_{Bn} \\ \vdots \\ \lambda_{B1} + \lambda_{B2} + \ldots + \lambda_{Bi-1} - n\lambda_{Bi} \\ \vdots \\ \lambda_{B1} - n\lambda_{B2} \\ -n\lambda_{B1} \end{bmatrix},$$

$$C = \begin{bmatrix} \lambda_{C1} + \lambda_{C2} + \ldots + \lambda_{Cn-1} - n\lambda_{Cn} \\ \vdots \\ \lambda_{C1} + \lambda_{C2} + \ldots + \lambda_{Ci-1} - n\lambda_{Ci} \\ \vdots \\ \lambda_{C1} - n\lambda_{C2} \\ -n\lambda_{C1} \end{bmatrix}$$

Step 2, pre-setting the three-phase reference voltage amplitude coefficients letting p, q, r be a number of healthy bridges respectively in the phases A, B, and C; conducting reconfiguration of reference voltage amplitude coefficients as follows:

in case of p=q=r, letting p*=q*=r*=p=q=r, $$\theta_{AB} = \theta_{BC} = \theta_{AC} = \frac{2\pi}{3}$$

wherein $\theta_{AB}$, $\theta_{BC}$, $\theta_{AC}$ being respectively the phase differences between the phases A and B, between B and C, and between A and C, and p*, q*, r* being respectively the reference voltage amplitude coefficients for the phases A, B, and C;

Step 3, removing each faulty H-bridge by means of the respective isolation switch:

obtaining fault locations and numbers thereof for all the IGBTs, and closing the isolation switch of each respective H-bridge where a faulty IGBT is located, thereby removing the faulty H-bridge from the inverter:

Step 4, reconfiguring total phase voltages for the three phases:

in case of the A-phase having the most numerous healthy bridges, and for p<q+r, configuring $\theta_{AB}$, $\theta_{BC}$, $\theta_{AC}$, p*, q*and r* in accordance with expression (1):

$$\begin{cases} p^2 + q^2 - 2pq\cos(\theta_{AB}) = p^2 + r^2 - 2pr\cos(\theta_{AC}) \\ \qquad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (1)$$

for p≥q+r, configuring $\theta_{AB}$, $\theta_{BC}$, $\theta_{AC}$, p*, q*and r* in accordance with expression (2):

$$\begin{cases} p^* = \sqrt{q^2 + qr + r^2}, q^* = q, r^* = r \\ \theta_{AB} = \cos^{-1}\left(\frac{q-r}{2p^*}\right) \\ \theta_{AB} + \theta_{AC} + \theta_{BC} = 360°, \theta_{BC} = 180° \end{cases} \quad (2)$$

in case of the B-phase having the most numerous healthy bridges,
for q<p+r, configuring $\theta_{AB}$, $\theta_{BC}$, $\theta_{AC}$, p*, q* and r* in accordance with expression (3):

$$\begin{cases} p^2 + q^2 - 2pq\cos(\theta_{AB}) = p^2 + r^2 - 2pr\cos(\theta_{AC}) \\ \qquad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (3)$$

for q≥p+r, configuring $\theta_{AB}$, $\theta_{BC}$, $\theta_{AC}$, p*, q* and r* in accordance with expression (4):

$$\begin{cases} q^* = \sqrt{p^2 + pr + r^2}, p^* = p, r^* = r \\ \theta_{BC} = \cos^{-1}\left(\frac{r-p}{2q^*}\right) \\ \theta_{AB} + \theta_{AC} + \theta_{BC} = 360°, \theta_{AC} = 180° \end{cases} \quad (4)$$

in case of the C-phase having the most numerous healthy bridges,
for r<p+q, configuring $\theta_{AB}$, $\theta_{BC}$, $\theta_{AC}$, p*, q* and r* in accordance with expression (5):

$$\begin{cases} p^2 + q^2 - 2pq\cos(\theta_{AB}) = p^2 + r^2 - 2pr\cos(\theta_{AC}) \\ \qquad = q^2 + r^2 - 2qr\cos(\theta_{BC}) \\ \theta_{AB} + \theta_{AC} + \theta_{BC} = 360° \\ p^* = p, q^* = q, r^* = r \end{cases} \quad (5)$$

for r≥p+q, configuring $\theta_{AB}$, $\theta_{BC}$, $\theta_{AC}$, p*, q* and r* in accordance with expression (6):

$$\begin{cases} q^* = \sqrt{p^2 + pr + r^2}, p^* = p, r^* = r \\ \theta_{AC} = \cos^{-1}\left(\frac{p-q}{2r^*}\right) \\ \theta_{AB} + \theta_{AC} + \theta_{BC} = 360°, \theta_{AB} = 180° \end{cases} \quad (6)$$

thus, the reference voltage amplitude coefficients and the phase differences of the three phases under various conditions having been obtained via the above calculations;

Conducting fault bridge removal and reference voltage reconfiguration for the healthy bridges as follows:

updating the fault signal vectors A, B, and C according to the fault locations and the numbers thereof for all the IGBTs calculating a number of remaining healthy bridges for each side phase according to expression (7):

$$\begin{cases} p = n - \sum_{i=1}^{n} \lambda_{Ai} \\ q = n - \sum_{i=1}^{n} \lambda_{Bi} \\ r = n - \sum_{i=1}^{n} \lambda_{Ci} \end{cases} \quad (7)$$

reconfiguring the total phase voltages for the three phases by means of selecting the corresponding reference voltage amplitude coefficients and reconfigured phase values calculated in accordance with the p, q, and r values $$\begin{cases} u_{Aref}(t) = p^*\sin(100\pi t) \\ u_{Bref}(t) = q^*\sin(100\pi t + \theta_{AB}) \\ u_{Cref}(t) = r^*\sin(100\pi t - \theta_{AC}) \end{cases} \quad (8)$$

Step 5 reconfiguring the remaining normal bridges:
reconfiguring the reference voltage signal for the fault bridge in combination with the expression (9):

$$\begin{cases} u_{Aref+}(t) = p^*\sin(100\pi t) + A(i) \\ u_{Aref-}(t) = p^*\sin(100\pi t) - A(i) \\ u_{Bref+}(t) = q^*\sin(100\pi t + \theta_{AB}) + B(i) \\ u_{Bref-}(t) = q^*\sin(100\pi t + \theta_{AB}) - B(i) \\ u_{Cref+}(t) = r^*\sin(100\pi t - \theta_{AC}) + C(i) \\ u_{Cref-}(t) = r^*\sin(100\pi t - \theta_{AC}) - C(i) \end{cases} \quad (9)$$

* * * * *